(12) United States Patent
Flosbach et al.

(10) Patent No.: US 6,815,501 B2
(45) Date of Patent: Nov. 9, 2004

(54) DUAL CURE COATING COMPOSITIONS AND PROCESS FOR THE PRODUCTION OF MULTILAYER COATINGS

(75) Inventors: Carmen Flosbach, Wuppertal (DE); Thomas Fey, Mainz (DE); Eva Frigge, Sprockhoevel (DE)

(73) Assignee: E. I. du Pont de Nemours and Company, Wilmington, DE (US)

(*) Notice: Subject to any disclaimer, the term of this patent is extended or adjusted under 35 U.S.C. 154(b) by 289 days.

(21) Appl. No.: 10/118,565

(22) Filed: Apr. 9, 2002

(65) Prior Publication Data

US 2003/0191272 A1 Oct. 9, 2003

(51) Int. Cl.⁷ ............... C09D 175/06; C09D 175/14; C08L 75/06; C08L 75/14; C08G 18/42
(52) U.S. Cl. ............... 525/123; 427/402; 427/407.1; 427/409; 427/412.1; 522/90; 522/96; 522/174; 524/457; 524/500; 524/507; 524/591; 524/839; 525/124; 525/131; 525/440; 525/453; 525/455; 525/457; 528/45; 528/60; 528/66; 528/69; 528/75; 528/80; 528/83
(58) Field of Search ............... 427/402, 407.1, 427/409, 412.1; 522/90, 96, 174; 524/457, 500, 507, 591, 839; 525/123, 124, 131, 440, 453, 455, 457; 528/45, 60, 66, 69, 75, 80, 83

(56) References Cited

U.S. PATENT DOCUMENTS

| | | | |
|---|---|---|---|
| 4,212,901 A | | 7/1980 | van Neerbos et al. |
| 4,587,323 A | * | 5/1986 | Toman ............... 528/66 |
| 4,609,706 A | * | 9/1986 | Bode et al. ............... 525/7.4 |
| 6,605,669 B2 | * | 8/2003 | Awokola et al. ............... 525/123 |

FOREIGN PATENT DOCUMENTS

WO   WO 02/20637   3/2002

* cited by examiner

Primary Examiner—Rabon Sergent
(74) Attorney, Agent, or Firm—Steven C. Benjamin

(57) ABSTRACT

Dual cure coating composition comprising resin solids, said resin solids being composed of (a) 30 to 90 wt. % of at least one hydroxy-functional polyester urethane having olefinic double bonds,
(b) 0 to 60 wt. % of at least one binder other than the polyester urethane (a) and/or at least one reactive diluent, and
(c) 10 to 50 wt. % of at least one cross-linking agent for hydroxy-functional components (a) and optionally (b), wherein the at least one polyester urethane (a) has a number average molecular mass of 1000 to 5000 and a hydroxyl value of 80 to 250 mg KOH/g, contains olefinic double bonds corresponding to an olefinic double bond equivalent weight of 250 to 2000 and is obtainable by the reaction, which proceeds with consumption of all isocyanate groups, of a component (a1) containing at least one isocyanate group and at least one olefinic double bond with a non-aromatic polyester polyol (a2) having a calculated molecular mass of 600 to 1400, an acid value of 0 to 30 mg KOH/g and a hydroxyl value of 250 to 600 mg KOH/g at a calculated hydroxyl functionality of 4.5 to 10, and wherein the sum of weight percentages of components (a) to (c) is 100 wt. %.

13 Claims, No Drawings

DUAL CURE COATING COMPOSITIONS AND PROCESS FOR THE PRODUCTION OF MULTILAYER COATINGS

FIELD OF THE INVENTION

The invention relates to dual cure coating compositions and to a process for the production of multilayer coatings using the dual cure coating compositions, in particular for the production of outer clear coats or top coats of multilayer coatings.

In relation to the present invention, the term "dual cure coating composition" means a coating composition that is curable by free-radical polymerization on UV irradiation and additionally by thermally induced polyaddition and/or polycondensation with the participation of hydroxyl groups.

BACKGROUND OF THE INVENTION

U.S. Pat. No. 4,212,901, for example, discloses dual cure coating compositions based on polyester polyols esterified with (meth)acrylic acid which are curable by free-radical polymerization of olefinic double bonds on UV irradiation and additional polyisocyanate curing agents.

In the case of three-dimensional substrates of complicated geometry, for example automotive bodies, it has not hitherto been satisfactorily possible to achieve an acceptable combined level of technological properties, for example, hardness, solvent resistance, acid resistance, scratch and mar resistance (particularly when the automobile is subjected to automatic car washing) on all the different surface zones of a substrate with a coating layer applied from a prior art dual cure coating composition. "Different surface zones" means zones of the surface accessible to irradiation with UV radiation and shaded areas (zones of the surface accessible to irradiation with UV radiation with difficulty or only in part or inaccessible zones). While the technological properties of the dual cure coating layer are excellent in surface zones directly accessible to UV radiation due to the combination of thermal and UV curing, the level of properties in the shaded areas which have only been cured thermally is poor, in particular hardness is inadequate in these areas.

Increasing the hydroxyl value of the hydroxy-functional binder comprising olefinic double bonds in a dual cure coating composition with the aim of improving the technological properties of the coating layer in shaded areas generally results, due to the accompanying increase in the binder's olefinic double bond equivalent weight (mass in grams which contains one mole of olefinic double bonds) which conventionally occurs, in a degradation of the level of properties of the coating layer in surface zones which are cured both by UV irradiation and thermally. Conversely, when the olefinic double bond equivalent weight is reduced, the accompanying reduction in hydroxyl value which conventionally occurs results in a degradation of the level of properties in shaded areas. On the other hand, the aim is not straightforwardly achieved by simply increasing the hydroxyl value and simultaneously reducing the olefinic double bond equivalent weight because compatibility problems frequently occur between such binders and other constituents of the coating composition.

There was a requirement to find dual cure coating compositions which do not exhibit the known weaknesses; coating layers applied there from should exhibit an at least satisfactory level of properties when only thermally cured and excellent properties when cured both thermally and by UV irradiation.

The present invention meets this requirement by providing a dual cure coating composition which achieves the stated object, which composition contains a reaction product of a specific polyester polyol with an isocyanate-functional component comprising olefinic double bonds, wherein said reaction product is distinguished by good compatibility with other binders, reactive diluents, solvents as well as cross-linking agents.

SUMMARY OF THE INVENTION

The present invention provides a dual cure coating composition, the resin solids content of which is composed of (a) 30 to 90, preferably 40 to 70 wt. % of at least one hydroxy-functional polyester urethane having olefinic double bonds, (b) 0 to 60, preferably 5 to 50 wt. % of at least one binder other than the polyester urethane (a) and/or at least one reactive diluent, and (c) 10 to 50 wt. % of at least one cross-linking agent for hydroxy-functional components (a) and optionally (b), wherein the at least one polyester urethane (a) has a number average molecular mass of 1000 to 5000 and a hydroxyl value of 80 to 250 mg KOH/g, contains olefinic double bonds corresponding to an olefinic double bond equivalent weight of 250 to 2000 and is obtainable by the reaction, which proceeds with consumption of all isocyanate groups, of a component (a1) containing at least one isocyanate group and at least one olefinic double bond with a non-aromatic polyester polyol (a2) having a calculated molecular mass of 600 to 1400, preferably of 800 to 1200, an acid value of 0 to 30 mg KOH/g and a hydroxyl value of 250 to 600, preferably of 270 to 400 mg KOH/g at a calculated hydroxyl functionality of 4.5 to 10, preferably of 4.8 to 8, and wherein the sum of weight percentages of components (a) to (c) is 100 wt. %.

DETAILED DESCRIPTION OF THE EMBODIMENTS

All the number average molecular masses stated here and below are values determined by gel permeation chromatography (GPC, polystyrene as standard, tetrahydrofuran as mobile phase).

The hydroxy-functional polyester urethane (a) present in the dual cure coating composition has a number average molecular mass of 1000 to 5000, preferably of 1200 to 3000, a hydroxyl value of 80 to 250, preferably of 100 to 200 mg KOH/g and contains olefinic double bonds corresponding to an olefinic double bond equivalent weight of 250 to 2000, preferably of 300 to 1000. The polyester urethane (a) is soluble in organic solvents and highly compatible with the other constituents (b) and (c) of the coating composition.

The polyester urethane (a) is obtainable by reacting the components (a1) and (a2) described in greater detail below. The hydroxyl groups of the polyester urethane (a) are hydroxyl groups from the polyester polyol (a2) not consumed during the reaction of components (a1) and (a2), while the olefinic double bonds of the polyester urethane (a)

originate from component (a1) and, optionally in part also from the polyester polyol (a2). The reactants (a1) and (a2) are selected in nature and quantity and, with regard to sequence of addition and nature of reaction control, reacted in a conventional manner known to the person skilled in the art with complete consumption of the isocyanate groups of (a1), such that the above-stated characteristics (number average molecular mass, hydroxyl value, olefinic double bond equivalent weight) are achieved for the polyester urethane (a). The reaction of components (a1) and (a2) may proceed in bulk or, preferably, in a solvent (mixture) inert towards isocyanate and/or in a reactive diluent (mixture) inert towards isocyanate and acting as diluent, for example at a temperature of 60 to 100° C. Once the reaction is complete, solvents may optionally be removed down to the desired content, for example by distillation.

The polyester urethane (a) may be used as such or as an organic, for example 60 to 80 wt. % solution in reactive diluent(s) and/or solvent(s) for the production of the dual cure coating compositions. The reactive diluents and/or solvents may comprise components used as diluents during the reaction of (a1) with (a2) and/or separately added to establish a desired solids content.

Component (a1) used in the production of the polyester urethane (a) and carrying at least one isocyanate group and at least one olefinic double bond may, for example, comprise an isocyanate-functional, olefinically unsaturated and free-radically polymerizable monomer, for example an isocyanatoalkyl (meth)acrylate, such as for example isocyanatoethyl (meth)acrylate or isocyanatopropyl (meth)acrylate. Preferably, however, it comprises a urethane(urea) prepolymer, preferably a urethane prepolymer. The urethane (urea) prepolymer has, for example, a number average molecular mass of 250 to 2000 and contains free isocyanate groups corresponding to an NCO value of for example 3 to 15 and olefinic double bonds corresponding to an olefinic double bond equivalent weight of for example 200 to 500. The average NCO functionality of the urethane(urea) prepolymers may, for example, amount to 0.5 to 2.5 per molecule.

Such urethane(urea) prepolymers (a1) may preferably be produced in a conventional manner known to the person skilled in the art by reacting in particular (cyclo)aliphatic and/or araliphatic polyisocyanates (a11) with compounds (a12), which comprise at least one group capable of addition with isocyanate groups, in particular hydroxyl group, primary amino group or secondary amino group and at least one olefinic double bond, in particular (meth)acryloyl group, optionally together with, although not preferred, compounds (a13), which comprise at least two groups capable of addition with isocyanate groups, in particular hydroxyl groups, primary amino groups and/or secondary amino groups. The reaction of the reactants (a11), (a12) and optionally (a13) is here performed with complete consumption of the groups in the reaction system capable of addition with isocyanate groups. By selection of the nature and quantity of the reactants (a11), (a12) and (a13), the sequence of addition and nature of reaction control, the characteristics (number average molecular mass, NCO value, NCO functionality, olefinic double bond equivalent weight) of the urethane (urea) prepolymer (a1) may be established in the conventional manner known to the person skilled in the art. The reaction of components (a11), (a12) and optionally (a13) may proceed in bulk or, preferably, in a solvent (mixture) inert towards isocyanate and/or in a reactive diluent (mixture) inert towards isocyanate and acting as, diluent, for example at a temperature of 60 to 100° C. Once the reaction is complete, solvents may optionally be removed down to the desired content, for example by distillation.

Examples of (cyclo)aliphatic and araliphatic polyisocyanates (a11) are nonane triisocyanate, as well as diisocyanates, such as tetramethylxylylene diisocyanate, 1,6-hexane diisocyanate, trimethylhexane diisocyanate, 1,12-dodecane diisocyanate, cyclohexane diisocyanate, isophorone diisocyanate, biscyclohexylmethane diisocyanate or mixtures thereof, as well as polyisocyanates derived from such diisocyanates, for example those containing heteroatoms in the residue linking the isocyanate groups. Examples of the latter are polyisocyanates comprising carbodiimide groups, allophanate groups, isocyanurate groups, uretidione groups, urethane groups and/or biuret groups, such as in particular tris(6-isocyanatohexyl)biuret, isophorone diisocyanate isocyanurate or hexane diisocyanate isocyanurate. Preferred polyisocyanates (a11) used in the production of the urethane(urea) prepolymers are hexane diisocyanate-based polyisocyanates, such as in particular tris(6-isocyanatohexyl)biuret or hexane diisocyanate isocyanurate.

Examples of compounds (a12) are allyl alcohol, hydroxyalkyl (meth)acrylates, such as hydroxyethyl (meth)acrylate, isomeric hydroxypropyl or hydroxybutyl (meth)acrylates, but also glycerol mono- and di(meth)acrylate, trimethylolpropane mono- and di(meth)acrylate or pentaerythritol tri (meth)acrylate, dipentaerythritol penta(meth)acrylate, monoalkylaminoalkyl (meth)acrylates, such as N-tert.-butylaminoethyl (meth)acrylate as well as addition products of (meth)acrylic acid with monoepoxides, such as the glycidyl ester of a branched tertiary C10-alkane monocarboxylic acid (Cardura E 10®).

Examples of compounds (a13) that are preferably not also used during synthesis of the urethane(urea) prepolymer (a1) are polymer polyols, compounds stated below as examples of polyols (a21), polyamines, such as ethylenediamine, diethylenetriamine and aminoalcohols, such as diethanolamine, methylethanolamine, methyldiethanolamine.

The non-aromatic polyester polyol (a2) used for production of the polyester urethane (a) is randomly composed of non-aromatic polyester building blocks and has a highly branched structure. Of course, the polyester polyol (a2) may nevertheless contain small proportions of aromatic structures, for example of up to 2 wt. % (calculated as $C_6$, molecular mass 72). These small proportions of aromatic structures may, however, merely arise from industrial contamination of the per se non-aromatic polyester building blocks.

The non-aromatic polyester polyol (a2) is preferably synthesized from components, which comprise (a21) hydroxyl components, which consist to an extent of 0 to 20 wt. % of at least one diol and to an extent of 80 to 100 wt. % of at least one polyol having 3 to 6 hydroxyl groups, (a22) carboxyl components, which consist to an extent of 0 to 20 wt. % of at least one monocarboxylic acid and to an extent of 80 to 100 wt. % of at least one dicarboxylic acid, and (a23) optionally, at least one hydroxycarboxylic acid component, wherein the sum of weight percentages of components (a21) and of components (a22) in each case amounts to 100 wt. %.

The non-aromatic polyester polyol (a2) is particularly preferably synthesized 0 from 30 to 60, in particular 40 to 55 wt. % of at least one hydroxyl component (a21), 30 to 70, in particular 45 to 60 wt. % of at least one carboxyl component (a22) and 0 to 10, preferably 0 wt. % of at least one hydroxycarboxylic acid component (a23). The sum of the weight percentages of components (a21) to (a23) is here 100 wt. % without taking account of the water of reaction formed during synthesis of the polyester polyol (a2).

The hydroxyl components (a21) consist to an extent of 0 to 20 wt. % of at least one (cyclo)aliphatic diol and to an extent of 80 to 100 wt. %, preferably exclusively, of at least one (cyclo)aliphatic polyol having 3 to 6 hydroxyl groups.

Examples of (cyclo)aliphatic diols as hydroxyl components (a21) are ethylene glycol, 1,2- and 1,3-propylene glycol, 1,3-, 1,4-, 2,3-butanediol, 1,5-pentanediol, 1,6-hexanediol, trimethylhexanediol, diethylene glycol, triethylene glycol, hydrogenated bisphenols, 1,4-cyclohexanedimethanol, neopentyl glycol, butylethylpropanediol. Hexanediol, neopentyl glycol, butylethylpropanediol are preferred.

Examples of (cyclo)aliphatic polyols having 3 to 6 hydroxyl groups as hydroxyl components (a21) are glycerol, trimethylolpropane, trimethylolethane, pentaerythritol, dipentaerythritol, ditrimethylolpropane, sorbitol, mannitol. Glycerol, trimethylolpropane and pentaerythritol, in particular trimethylolpropane and pentaerythritol, are preferred.

The carboxyl components (a22) contained in the polyester polyol (a2) consist to an extent of 0 to 20 wt. % of at least one (cyclo)aliphatic monocarboxylic acid and to an extent of 80 to 100 wt. %, preferably exclusively, of at least one (cyclo)aliphatic dicarboxylic acid.

Examples of (cyclo)aliphatic monocarboxylic acids as the carboxyl components (a22) are saturated fatty acids, such as for example 2-ethylhexanoic acid, isononanoic acid, coconut fatty acid, decanoic acid, dodecanoic acid, tetradecanoic acid, stearic acid, palmitic acid. Isononanoic acid, coconut fatty acid are preferred.

Examples of (cyclo)aliphatic dicarboxylic acids as carboxyl components (a22) are tetrahydrophthalic acid, hexahydrophthalic acid, 1,3- and 1,4-cyclohexanedicarboxylic acid, succinic acid, adipic acid, sebacic acid, azelaic acid, dodecanedicarboxylic acid, but also maleic acid, fumaric acid and dimer fatty acids, preferably $C_{36}$-dimer fatty acid. Dimer fatty acids comprise industrial mixtures that may also contain olefinic and/or aromatic carbon-carbon double bonds. Hexahydrophthalic acid, 1,4-cyclohexanedicarboxylic acid, adipic acid and dimer fatty acid are preferred. If they exist, the corresponding dicarboxylic anhydrides may also be used instead of the dicarboxylic acids.

In particular, it is preferred if the polyester polyol (a2) contains dimer fatty acid as one of at least two dicarboxylic acids (a22), specifically in a ratio by weight of 5 to 45 wt. % of dimer fatty acid and 55 to 95 wt. % of at least one other dicarboxylic acid.

At least one (cyclo)aliphatic hydroxycarboxylic acid (a23) may optionally also participate in the synthesis of the polyester polyol (a2), but to an extent of no more than 10 wt. %, relative to the sum of components (a21) to (a23). Examples of hydroxycarboxylic acids are 12-hydroxystearic acid, 6-hydroxyhexanoic acid, citric acid, tartaric acid, dimethylolpropionic acid. If they exist, the corresponding lactones may also be used instead of the monohydroxycarboxylic acids.

The non-aromatic polyester polyol (a2) may be produced by polycondensation from the previously stated components (a21), (a22) and optionally (a23), wherein components (a21) to (a23) are selected in nature and quantity such that the above-stated characteristics (calculated molecular mass, calculated hydroxyl functionality, hydroxyl and acid value) are obtained for the polyester polyol (a2). Polycondensation may be performed using conventional processes familiar to the person skilled in the art, for example in the presence of conventional esterification catalysts and at elevated temperatures of for example 180 to 250° C., for example in a melt. Entraining agents, such as xylene, may optionally also be used. Components (a21) to (a23) may be reacted together in a multi- or preferably single-stage synthesis process to yield the polyester polyol (a2). Preferably, all the components (a21) to (a23) are initially introduced at the same time and heated together, so optionally being melted, and polycondensed together to yield the polyester polyol (a2).

Component (b), which constitutes 0 to 60, but preferably 5 to 50 wt. %, of the resin solids content comprises one or more binders differing from the polyester urethane (a) and/or reactive diluent(s), in particular (meth)acrylic copolymer resins, polyurethane resins, polyester resins and/or reactive diluents that may in each case comprise hydroxyl groups and/or olefinic double bonds as reactive functional groups.

Examples of hydroxy-functional binders (b) are conventional hydroxy-functional polyester or polyurethane resins having a number average molecular mass of 500 to 5000, preferably of 1000 to 3000 and hydroxyl values of 30 to 600, preferably of 50 to 400 mg KOH/g, as well as hydroxy-functional (meth)acrylic copolymer resins having a number average molecular mass of 1000 to 10000 and hydroxyl values of 30 to 200, preferably of 50 to 180 mg KOH/g.

Examples of binders (b) comprising olefinic double bonds are (meth)acryloyl-functional (meth)acrylic copolymers, polyurethane (meth)acrylates, polyester (meth)acrylates, unsaturated polyesters, polyether (meth)acrylates, silicone (meth)acrylates and epoxy resin (meth)acrylates having number average molecular masses of for example 500 to 10000, preferably of 500 to 5000.

Examples of hydroxy-functional reactive diluents (b) are low molecular weight compounds having a molecular mass of for example below 500, at least two hydroxyl groups per molecule and hydroxyl values in the range of 250 to 700 mg KOH/g. Oligomeric or polymeric polyols are suitable, such as polyether polyols, oligoester polyols, polycarbonate polyols, polycaprolactone polyols and oligourethane polyols.

Reactive diluents (b) having olefinic double bonds, which may also be used as inert diluents in the synthesis of components (a) or (a1), comprise low molecular weight compounds having a molecular mass of for example below 1000. The reactive diluents may be mono-, di- or polyunsaturated. Examples of monounsaturated reactive diluents are (meth)acrylic acid and the esters thereof, maleic acid and the semi-esters thereof, vinyl acetate, vinyl ethers, styrene, vinyltoluene. Examples of diunsaturated reactive diluents are di(meth)acrylates, such as alkylene glycol di(meth) acrylate, 1,3-butanediol di(meth)acrylate, vinyl (meth) acrylate, allyl (meth)acrylate, divinylbenzene, dipropylene glycol di(meth)acrylate, hexanediol di(meth)acrylate. Examples of polyunsaturated reactive diluents are glycerol tri(meth)acrylate, trimethylolpropane tri(meth)acrylate, pentaerythritol tetra(meth)acrylate, dipentaerythritol hexa (meth)acrylate.

Examples of reactive diluents (b) having hydroxyl groups as well as olefinic double bonds are compounds, such as glycerol mono- and di(meth)acrylate, trimethylolpropane mono- and di(meth)acrylate or pentaerythritol tri(meth) acrylate, dipentaerythritol penta(meth)acrylate.

Component (c) of the resin solids content comprises cross-linking agents for the hydroxy-functional components (a) and optionally (b). In particular, it comprises cross-linking components conventional for cross-linking hydroxy-functional binders, such as aminoplast resins, in particular melamine resins, polyisocyanates, the NCO-groups of which may be blocked, and/or transesterification cross-linking agents, such as for example tris (alkoxycarbonylamino)triazines.

Preferred cross-linking agents (c) are free polyisocyanates; in this case, the dual cure coating compositions are produced only shortly before application by mixing together separately stored components. In the preferred case of two components, one of the two components is the coating base component, wherein the other component contains the free polyisocyanate cross-linking agent.

Examples of polyisocyanates usable in free or blocked form as cross-linking agents (c) are the polyisocyanates listed above as components (a11).

Particularly suitable polyisocyanate cross-linking agents are conventional is coating polyisocyanate cross-linking agents, in particular tris(6-isocyanatohexyl)biuret, isophorone diisocyanate isocyanurate or hexane diisocyanate isocyanurate.

Suitable blocking agents for the polyisocyanate cross-linking agents are the conventional, for example CH-acidic, NH-, SH- or OH-functional, blocking agents. Examples are acetylacetone, acetoacetic acid alkyl esters, malonic acid dialkyl esters, aliphatic or cycloaliphatic alcohols, oximes, lactams, imidazoles, pyrazoles, triazoles.

In the ready-to-apply state, the dual cure coating compositions have a solids content, constituted by the resin solids content, at least one photoinitiator, optionally together with non-volatile additives, optionally pigments and optionally extenders, of 40 to 80 wt. %. The volatile constituents they contain are organic solvents and/or water, optionally together with volatile additives. The dual cure coating compositions are preferably non-aqueous.

Examples of organic solvents usable in the dual cure-coating compositions are glycol ethers, such as ethylene glycol monobutyl ether, diethylene glycol monobutyl ether, dipropylene glycol dimethyl ether, dipropylene glycol monomethyl ether, ethylene glycol dimethyl ether; glycol ether esters, such as ethylene glycol monoethyl ether acetate, ethylene glycol monobutyl ether acetate, diethylene glycol monobutyl ether acetate, methoxypropyl acetate; esters, such as butyl acetate, isobutyl acetate, amyl acetate; ketones, such as methyl ethyl ketone, methyl isobutyl ketone, diisobutyl ketone, cyclohexanone, isophorone; alcohols, such as methanol, ethanol, propanol, butanol; aromatic hydrocarbons, such as xylene, Solvesso® 100 (mixture of aromatic hydrocarbons with a boiling range of 155 to 185° C.), Solvesso® 150 (mixture of aromatic hydrocarbons with a boiling range of 182 to 202° C.) and (cyclo)aliphatic hydrocarbons.

The dual cure coating compositions contain 0.1 to 5 wt. %, preferably 0.5 to 3 wt. %, of photoinitiators, relative to their resin solids content. Examples of photoinitiators are benzoin and derivatives thereof, acetophenone and derivatives thereof, for example 2,2-diacetoxyacetophenone, benzophenone and derivatives thereof, thioxanthone and derivatives thereof, anthraquinone, 1-benzoylcyclohexanol, organophosphorus compounds, such as acylphosphine oxides.

In addition to photoinitiators, the dual cure coating compositions may contain additives conventionally used in connection with coatings in quantities of, for example, up to 5 wt. %, relative to ready-to-apply dual cure coating composition, for example leveling agents, rheological agents, such as pyrogenic silica, reaction products containing urea groups prepared from amines and polyisocyanates ("sag control agents"), inhibitors which suppress premature free-radical polymerization, thermal free-radical initiators, catalysts, dyes, light stabilisers, UV-absorbers, antioxidants, polymer microparticles such as microgels, formaldehyde-releasing substances.

Depending upon the intended application, as a clear coat coating composition or as an opaque coating composition, the dual cure coating compositions may be unpigmented, transparently or opaquely pigmented. They may accordingly contain extenders and/or pigments in a ratio by weight of pigments plus extenders:resin solids content of for example 0.1:11 to 3:1. Examples of inorganic or organic color-imparting pigments are titanium dioxide, micronised titanium dioxide, iron oxide pigments, carbon black, azo pigments, phthalocyanine pigments, quinacridone or pyrrolopyrrole pigments. Examples of special effect-imparting pigments are metal pigments, such as for example made from aluminium or other metals; interference pigments, for example metal oxide coated metal pigments, for example titanium dioxide coated or mixed oxide coated aluminium, coated mica, such as for example titanium dioxide coated mica. Examples of usable extenders are silicon dioxide, aluminium silicate, barium sulfate, calcium carbonate and talcum.

The dual cure coating compositions are preferably formulated on the basis of organic solvents. They may, however, also assume water-dilutable form. Conversion into the aqueous form may proceed in the conventional manner familiar to the person skilled in the art by neutralization of neutralizable groups and/or by the addition of nonionic emulsifiers and conversion into the aqueous phase. Organic solvents may be removed before or after addition of water, for example by distillation. Conversion into the aqueous phase may, for example, proceed using rotor/stator units.

The dual cure coating compositions may, for example, be used in the production of multilayer coatings on any desired substrates, for example of metal, plastics, or composite substrates made of metal and plastics, and in particular for the production of an outer pigmented top coat, transparent clear coat or transparent sealing coat of a multilayer coating. The outer coating layer may, for example, be applied by the wet-on-wet process onto a prior coating applied onto a substrate, whereupon the two layers are cured together. The invention accordingly also relates to the process for the production of multilayer coatings. The preferably non-aqueous dual cure coating compositions may here preferably be applied as transparent clear coats on layers of aqueous or solvent-containing, color- and/or special effect-imparting base coats. The dual cure coating compositions are also suitable for the production of primer layers on substrates of fibre-reinforced plastics.

The dual cure coating compositions are applied to a dry film thickness of, for example, 15 to 50 μm using known processes, in particular by spraying. After a short flash-off phase, which is generally provided, the applied dual cure coating composition is cross-linked thermally, for example at 20 to 160° C. Thermal cross-linking preferably proceeds by balking and/or by irradiation with IR and/or near infrared radiation. Additional cross-linking proceeds by free-radical polymerization initiated by means of UV irradiation, wherein UV irradiation may proceed before, during and/or after thermal cross-linking. Object temperatures during baking are preferably between 60 and 160° C., particularly preferably between 120 and 150° C. In the case of three-dimensional substrates with shaded areas, UV irradiation naturally proceeds on the surface zones of the coating layer accessible to UV irradiation, in the case of an automotive body, for example on the outer, visible surfaces thereof.

The dual cure coating compositions are in particular suitable for the production of the above-stated multilayer coatings in automotive original and repair coating both of automotive bodies and body parts.

The coatings applied from the dual cure coating compositions, when cured both thermally and by UV irradiation, are distinguished by excellent solvent resistance, acid resistance, mar resistance, hardness and very good optical properties. When the coatings are only thermally cured, not only are very good optical properties and mar resistance obtained but the solvent resistance, acid resistance and hardness are at least satisfactory. The dual cure coating compositions are accordingly in particular suitable for coating three-dimensional substrates of a complicated shape with surface zones that are variably accessible or also inaccessible to irradiation with UV radiation, such as automotive bodies and body parts.

EXAMPLES

Example 1 Production of a Polyester Polyol (a2)

773 g of trimethylolpropane, 604 g of hexahydrophthalic anhydride and 231 g of dimer fatty acid (commercial name Empol® 1008 from Cognis) were combined with 60 g of xylene and heated to a maximum of 230° C. Esterification was continued, with removal of water, until an acid value of 5 mg KOH/g was obtained. After cooling to 125° C., a solids content of 79.5 wt. % was established with 322 g of butyl acetate.

The polyester polyol had an OH value of 324 mg KOH/g, a calculated hydroxyl functionality of 5.6 and a calculated molecular mass of 980.

Example 2 Production of a Polyester Urethane Binder of Type (a)

398 g of HDI isocyanurate (Tolonate® HDT from Rhodia), 1.2 g of methylhydroquinone, 1 g of dibutyltin dilaurate solution (10%) and 100 g of butyl acetate were mixed and heated to 60° C. 207 g of pentaerythritol triacrylate in 147 g of pentaerythritol tetraacrylate were added in such a manner that the temperature did not exceed 80° C. Once the solution had reached an NCO value of 6.7%, 81 g of hydroxyethyl acrylate were apportioned in such a manner that the temperature did not exceed 80° C. Rinsing was performed with 100 g of butyl acetate. Once the solution had reached an NCO value of 2.8%, 833 g of the polyester polyol (a2) from Example 1 were added. The reaction mixture was maintained at 80° C. until an NCO value was no longer detectable. The mixture was then thinned with butyl acetate to yield a resin solution with a solids content of 73.1 wt. %.

The polyester urethane had an olefinic double bond equivalent weight of 487 and an OH value of 129 mg KOH/g.

Example 3 Production of a Comparative Binder 901 g of HDI isocyanurate (Tolonate® HDT from Rhodia) were mixed with 260 g of butyl acetate, 1.2 g of methylhydroquinone and 1 g of dibutyltin dilaurate solution (10%) and heated to 60° C. 365 g of hydroxyethyl acrylate were added in such a manner that the temperature did not exceed 80° C. Rinsing was performed with 104 g of butyl acetate. Once the solution had reached an NCO value of 4.1, 211 g of trimethylolpropane were added. The reaction mixture was maintained at 80° C. until an NCO value was no longer detectable. The mixture was then thinned with butyl acetate to yield a resin solution with a solids content of 75.1 wt. %.

The binder had an olefinic double bond equivalent weight of 470 and an OH value of 120 mg KOH/g.

Coating bases 4 and 5 were prepared with the resin solutions from Examples 2 and 3:

| Constituents | Coating base, Example 4 | Coating base, Example 5 |
|---|---|---|
| Resin solution from Example 2 | 53.6 | ./. |
| Resin solution from Example 3 | ./. | 49.6 |
| Pentaerythritol tetraacrylate | ./. | 4.0 |
| Byk® 345 (levelling agent from BYK) | 0.4 | 0.4 |
| Byk® 306 (wetting agent | 0.2 | 0.2 |

-continued

| Constituents | Coating base, Example 4 | Coating base, Example 5 |
|---|---|---|
| from BYK) | | |
| Tinuvin ® 292 (HALS light stabiliser from Ciba) | 0.8 | 0.8 |
| Tinuvin ® 400 (UV absorber from Ciba) | 0.8 | 0.8 |
| Darocure ® 1173 (photoinitiator from Ciba) | 0.7 | 0.7 |
| Irgacure ® 819 (photoinitiator from Ciba) | 0.7 | 0.7 |
| Butyl acetate | 20.6 | 20.6 |
| Butyl glycol acetate | 22.2 | 22.2 |

100 parts by weight of each of coating bases 4 and 5 were mixed in each case with 25 parts by weight of curing agent (hexamethylene diisocyanate trimer, 80%, dissolved in a 1:1 mixture of butyl acetate and Solvesso® 100) to yield clear coat compositions 6 and 7.

Metal test panels coated with a cathodic electrodeposition coating primer, surfacer and flashed-off black water-borne base coat were pneumatically spray coated with the clear coat compositions 6 and 7, in each case to a clear coat dry film thickness of 35 μm, were flashed off for 5 minutes at 20° C. and then baked for 10 minutes at 140° C. (object temperature). High-gloss black multilayer coatings were obtained, which were subjected to the technological tests described below.

The clear coat layers of analogously produced metal test panels were additionally cross-linked by UV irradiation before the technological tests. To this end, the coats were irradiated with a high-pressure mercury vapour lamp (240 W/cm) while ensuring a dose of 1.3 J/cm$^2$ and an intensity of 0.5 W/cm$^2$.

| | Hardness[1] | Acid resistance[2] | Mar resistance[3] |
|---|---|---|---|
| Clear coat 6 (thermal) | 85 | 2 | 85 |
| Clear coat 6 (thermal + UV) | 170 | 1 | 80 |
| Clear coat 7 (thermal) | 10 | 5 | 82 |
| Clear coat 7 (thermal + UV) | 140 | 1 | 80 |

[1])Hardness testing according to DIN EN-ISO 1522, value in seconds.
[2])A drop of 10% sulphuric acid was placed on the surface of the clear coat and the metal test sheet was placed on a hot plate for 30 minutes at 45° C.. The surface of the clear coat was then washed and assessed for corrosive attack (rating scale from 0 to 5; 0 = no mark, 1 = slight corrosive attack, 2 = incipient corrosive attack, 3 = distinct corrosive attack, 4 = destruction of clear coat and attack of base coat with discoloration, 5 = coating destroyed down to sheet metal).
[3])Residual gloss was measured in % (ratio of initial gloss of the clear coat surface to its gloss after wash scratching, gloss measurement in each case being performed at an angle of illumination of 20°). Wash-scratching was performed using an Amtec Kistler laboratory car wash system (c.f. Th. Klimmasch and Th. Engbert, Entwicklung einer einheitlichen Laborprüfmethode für die Beurteilung der Waschstraßenbeständigkeit von Automobil-Decklacken [development of a standard laboratory test method for evaluating resistance of automotive top coats to car wash systems], in DFO proceedings 32, pages 59 to 66, technology seminars, proceedings of the seminar on 29–30.4.97 in Cologne, published by Deutsche Forschungsgesellschaft für Oberflächenbehandlung e.V., Adersstraße 94, 40215 Dusseldorf).

The clear coat 6 according to the invention and comparative clear coat 7 each contained binders having a comparable hydroxyl value and comparable olefinic double bond equivalent weight and exhibit virtually no differences in technological properties when cured both thermally and by UV irradiation. When only thermally cured (simulation of curing in shaded areas), clear coat 6 according to the invention was superior to the comparative clear coat 7 with regard to hardness and acid resistance.

What is claimed is:

1. Coating compositions comprising resin solids, said resin solids consisting of
   (a) 30 to 90 wt. % of at least one hydroxy-functional polyester urethane having olefinic double bonds,
   (b) 0 to 60 wt. % of at least one constituent having functional groups selected from the group consisting of hydroxyl groups, double bonds and mixtures thereof, said constituent selected from the group consisting of binder(s) other than the polyester urethane (a), at least one reactive diluent and any mixture of the binder(s) and reactive diluent,
   (c) 10 to 50 wt. % of at least one cross-linking agent for hydroxy-functional components (a) and optional (b),
   wherein the at least one polyester urethane (a) has a number average molecular mass of 1000 to 5000 and a hydroxyl value of 80 to 250 mg KOH/g, contains olefinic double bonds corresponding to an olefinic double bond equivalent weight of 250 to 2000 and is formed by the reaction, which proceeds with consumption of all isocyanate groups, of a component (a1) containing at least one isocyanate group and at least one olefinic double bond with a non-aromatic polyester polyol (a2) having a calculated molecular mass of 600 to 1400, an acid value of 0 to 30 mg KOH/g and a hydroxyl value of 250 to 600 mg KOH/g at a calculated hydroxyl functionality of 4.5 to 10, and wherein the wt. % is based on resin solids and the sum of weight percentages of components (a) to (c) is 100 wt. %.

2. The coating compositions according to claim 1, wherein the resin solids consist of 40 to 70 wt. % of polyester urethane (a), 5 to 50 wt. % of component (b) and 10 to 50 wt. % of component (c).

3. The coating compositions according to claim 1, wherein the polyester urethane (a) has a number average molecular mass of 1200 to 3000 and a hydroxyl value of 100 to 200 mg KOH/g and contains olefinic double bonds corresponding to an olefinic double bond equivalent weight of 300 to 1000.

4. The coating compositions according to claim 1, wherein the non-aromatic polyester polyol (a2) has a calculated molecular mass of 800 to 1200 and a hydroxyl value of 270 to 400 mg KOH/g at a calculated hydroxyl functionality of 4.8 to 8.

5. The coating compositions according to claim 1, wherein component (a1) is selected from the group consisting of isocyanatoalkyl (meth)acrylates and urethane(urea) prepolymers having a number average molecular mass of 250 to 2000 and free isocyanate groups corresponding to an NCO value of 3 to 15 and a content of olefinic double bonds corresponding to an olefinic double bond equivalent weight of 200 to 500.

6. The coating compositions according to claim 1, wherein the non-aromatic polyester polyol (a2) is synthesized from (a21) hydroxyl components which consist 0 to 20 wt. % of at least one diol and of 80 to 100 wt. % of at least one polyol having 3 to 6 hydroxyl groups, (a22) carboxyl components which consist of 0 to 20 wt. % of at least one monocarboxylic acid and of 80 to 100 wt. % of at least one dicarboxylic acid, and (a23) optionally at least one hydroxycarboxylic acid component, wherein the sum of weight percentages of components (a21) and of components (a22) in each case amounts to 100 wt. %.

7. The coating compositions according to claim 6, wherein the non-aromatic polyester polyol (a2) is synthesized from 30 to 60 wt. % of at least one hydroxyl component (a21), 30 to 70 wt. % of at least one carboxyl component (a22) and 0 to 10 wt. % of at least one hydroxycarboxylic acid component (a23) and wherein the sum of weight percentages of components (a21) to (a23) is 100 wt. % without taking account of the water of reaction formed during synthesis of the polyester polyol (a2).

8. The coating compositions according to claim 1, wherein component (c) consists of cross-linking agents selected from the group consisting of aminoplast resins, polyisocyanates, polyisocyanate having blocked NCO groups esterification cross-linking agents and combinations thereof.

9. The coating composition according to claim 1, wherein, in addition to the resin solids, the composition comprises at least one photoinitiator, at least one component selected from the group consisting of non-volatile additives, extenders and pigments and in addition to, optionally, at least one volatile additive, the volatile fraction comprises at least one component selected from the group consisting of organic solvents and water.

10. The coating compositions according to claim 1, wherein the coating compositions comprise transparent clear coating compositions.

11. A process for the production of multilayer coatings on substrates, wherein at least one of the coating layers of the multilayer coating is applied from the coating composition according to claim 1 and is then cured thermally and additionally by UV irradiation.

12. A process for the production of multilayer coatings on substrates, wherein an outer clear coat layer is applied from the coating composition according to claim 10 and is then cured thermally and additionally by UV irradiation.

13. The process according to claim 11 or 12, wherein the substrates comprise substrates selected from the group consisting of automotive bodies and body parts.

* * * * *

UNITED STATES PATENT AND TRADEMARK OFFICE
CERTIFICATE OF CORRECTION

PATENT NO. : 6,815,501 B2
DATED : November 9, 2004
INVENTOR(S) : Carmen Flosbach et al.

It is certified that error appears in the above-identified patent and that said Letters Patent is hereby corrected as shown below:

Column 5,
Line 7, "0" to be removed between "synthesized" and "from"

Column 7,
Line 45, "is'" to be removed between "conventional" and "coating"

Column 8,
Line 46, "0.1 : 11" to be replaced with -- 0.1 : 1 --

Column 9,
Line 30, "balking" to be replaced with -- baking --

Column 12,
Line 65, "consist 0" to be replaced with -- consist of 0 --

Column 13,
Line 22, "groups esterification" to be replaced with -- groups, esterification --

Signed and Sealed this

Fifth Day of April, 2005

JON W. DUDAS
*Director of the United States Patent and Trademark Office*